2 Sheets. Sheet No 1
J. W. Hannan.
CAN HANDLE.
No. 121,168. Patented Nov. 21, 1871.
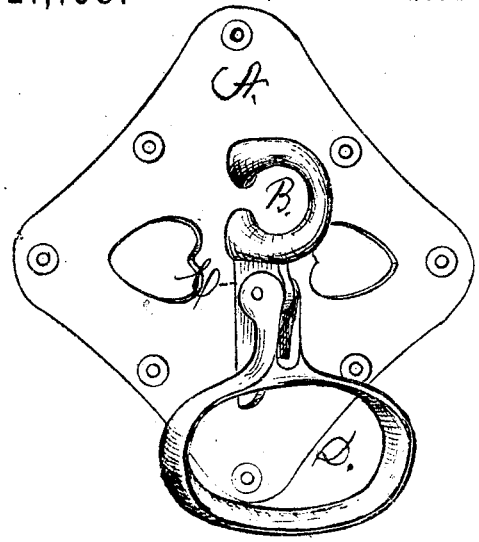
Witnesses
Geo. W. Tibbitts
N. J. Sweet
Inventor.
John W. Hannan

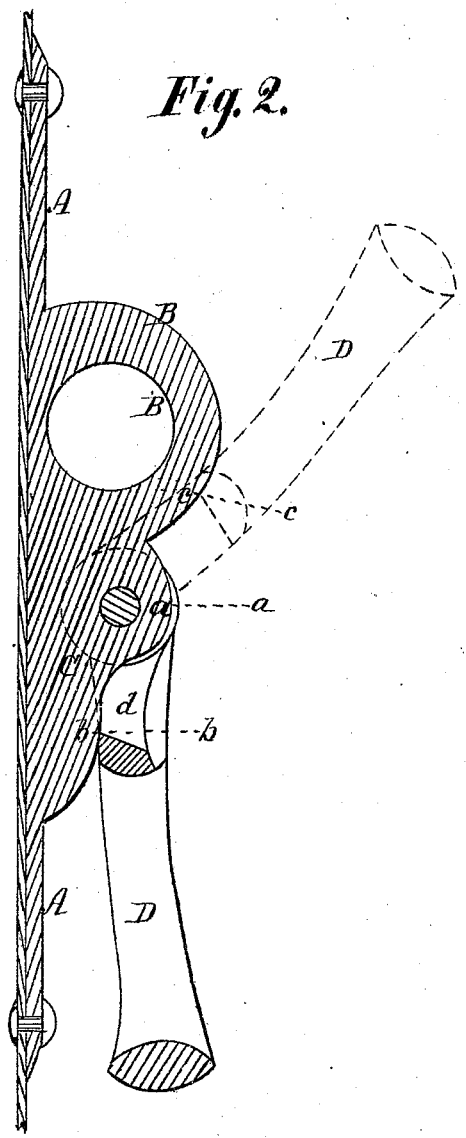

UNITED STATES PATENT OFFICE.

JOHN W. HANNAN, OF ELYRIA, OHIO.

IMPROVEMENT IN MILK-CAN HANDLES.

Specification forming part of Letters Patent No. 121,168, dated November 21, 1871.

*To all whom it may concern:*

Be it known that I, JOHN W. HANNAN, of Elyria, in the county of Lorain and State of Ohio, have invented a new and useful Improvement in Milk-Can Handles, of which the following is a specification:

In the manufacture of cheese milk is transported from the surrounding farms in large quantities to the cheese-factory. In emptying the milk into the cheese-vat the can is raised from the wagon, swung out to the vat, and tilted so as to empty it. This is effected by means of a rope and crane, the hooks of the rope being hooked into the eyes of the can-handles for this purpose. These cans hold from fifteen to sixty-five gallons of milk, and it is therefore of the highest importance that the eyes of the handles should be of great strength and durability and well adapted as a sure means for swinging out and sustaining heavy cans while being dumped. My improvement is designed to accomplish this in the most simple, cheap, and durable manner, and to this end I cast the eye B and lug C for the handle D in a single vertical rib, which constitutes an integral part of a plate, A, fastened to the can by rivets both above and below the eye and the handle, and on either side thereof, so as to constitute a durable and secure fastening, and thereby withstand the surging and dumping motion of the can from every direction. The rib C, which constitutes the hook-eye B and support for the handle, projects from the center of the plate A. The eye B is formed in its upper portion, and the support $a$, to which the handle is secured, just beneath the eye, and the extension $b$ from the handle-support $a$ constitutes a rest for the handle D to keep it out from the can and thus prevent rattling, while just above the handle-support $a$ the lower swell of the eye forms a stop, $c$, for the handle when turned up and used as such, as shown by dotted lines in Fig. 2 of the drawing. The contiguous positions of these several parts of the eye and lug are also shown in this view. The lower rest $b$ for the handle also serves an important advantage of maintaining the handle always in a position to be readily grasped by the hand. The shank $d$ of the handle is forked so as to embrace the rib or lug C of the eye and be secured by a strong rivet-bolt. The upper side of the shank between the forks is made concave, so as to receive the swell $c$ of the eye, which thereby is made to fit between the jaws $d$ of the handle and brace it laterally, thereby holding its inner concave side or bar firmly against the solid swell of the eye when used, while its inner flat side hangs against the prolongation $b$ of the eye when the handle is not used; and in this way both the inner and outer sides of the handle are utilized in relation to the contiguous parts of the eye and its solid rib, as shown in Fig. 2. The handle, when used to lift and carry the can, is supported by the lug and its eye in an upwardly-inclined position, and does not interfere with the eye, which is always free to be caught by the hook. The plate A, being secured on all sides to the can by rivets, and the eye and handle-support being a constituent part of said plate, it will be seen that the hook-eye, upon which all the strain falls, must be as durable as the plate itself; and as the connection of the latter with the can is open at no point, but bound alike on all sides, it must prove as durable as the can itself.

In the accompanying drawing, Figure 1 represents a view in perspective of a can-handle and eye embracing my improvement. Fig. 2 represents a vertical section of the same, the handle being shown in the two positions which it occupies when used and not used.

Having described my invention, I claim—

The herein-described can-handle, consisting of the plate A, hook-eye B, handle-lug C, extension $b$, and stop $c$, all cast in one piece for the reception of the hinged handle D, as a new article of manufacture.

JOHN W. HANNAN.

Witnesses:
GEO. W. TIBBITTS,
GEO. HESTER.

(112)